(12) United States Patent
Ferguson et al.

(10) Patent No.: US 8,430,230 B1
(45) Date of Patent: Apr. 30, 2013

(54) HOPPER LOADER FOR PROCESSING MACHINES

(75) Inventors: Norlan L. Ferguson, McPherson, KS (US); William Ray Turner, Lincolnville, KS (US); Robert Lloyd Babcock, McPherson, KS (US)

(73) Assignee: Norlan L. Ferguson, McPherson, KS (US)

(*) Notice: Subject to any disclaimer, the term of this patent is extended or adjusted under 35 U.S.C. 154(b) by 0 days.

(21) Appl. No.: 13/436,250

(22) Filed: Mar. 30, 2012

(51) Int. Cl.
*B65G 21/00* (2006.01)

(52) U.S. Cl.
USPC ............... 198/550.1; 198/540; 198/550.2; 198/550.5; 406/28; 406/34; 406/171; 406/175

(58) Field of Classification Search ............ 198/540, 198/541, 549, 550.1, 550.2, 550.5; 406/28, 406/34, 171, 175
See application file for complete search history.

(56) References Cited

U.S. PATENT DOCUMENTS

| | | | | |
|---|---|---|---|---|
| 456,336 | A * | 7/1891 | Paris | 425/176 |
| 3,183,553 | A * | 5/1965 | Slater | 198/550.1 |
| 3,720,241 | A * | 3/1973 | Bryant et al. | 141/25 |
| 3,995,734 | A * | 12/1976 | Berg, Jr. | 198/540 |
| 4,255,108 | A * | 3/1981 | Bleymaier et al. | 425/174.8 E |
| 4,610,344 | A * | 9/1986 | Eastman | 193/5 |
| 4,695,205 | A * | 9/1987 | Levine | 406/38 |
| 4,889,452 | A * | 12/1989 | Heyl | 406/85 |
| 5,040,665 | A * | 8/1991 | Suzuki | 198/743 |
| 5,762,712 | A * | 6/1998 | Sohn | 118/419 |
| 5,772,319 | A * | 6/1998 | Pemberton et al. | 366/76.2 |
| 6,024,208 | A * | 2/2000 | Chooi et al. | 198/534 |
| 6,095,803 | A * | 8/2000 | Slater | 432/13 |
| 6,241,072 | B1 * | 6/2001 | Ingraham | 198/347.3 |
| 6,383,301 | B1 * | 5/2002 | Bell et al. | 118/716 |
| 6,415,909 | B1 * | 7/2002 | Mitchell et al. | 198/716 |
| 7,228,956 | B2 * | 6/2007 | Pircon et al. | 198/560 |
| 7,318,459 | B2 * | 1/2008 | Frankeberger et al. | 141/67 |
| 7,476,265 | B2 * | 1/2009 | Firman | 55/385.1 |
| 7,850,047 | B2 * | 12/2010 | Boroch et al. | 222/181.2 |
| 7,979,152 | B2 * | 7/2011 | Davidson | 700/118 |
| 2012/0099934 | A1 * | 4/2012 | Marchesini et al. | 406/153 |
| 2012/0151877 | A1 * | 6/2012 | Stamm Kristensen et al. | 53/411 |

OTHER PUBLICATIONS

Photograph of Shot Hopper made by Applicant and used at Ferguson Production, Inc. since 1995.
Printout of Internet information page by Autoload, 13600 Dabney Road, Woodbridge, VA 22191-1446 and close-up photograph showing Autoload 1525-R which applicant concedes to be prior art to the invention in the present application.

* cited by examiner

*Primary Examiner* — Joseph A Dillon, Jr.
(74) *Attorney, Agent, or Firm* — Hovey Williams LLP (57) ABSTRACT

A hopper loader is provided for supplying particulate material to a processing machine. The hopper loader includes a receiver with latching members configured for coupling to a hopper assembly. The hopper assembly includes a hopper which preferably has translucent side walls to permit visual inspection of the contents of the chamber within the hopper, and a filter element positioned atop the receiver which is configured so that particulate material trapped by the filter element will periodically fall back into the chamber for processing without operator intervention.

9 Claims, 7 Drawing Sheets

HOPPER LOADER FOR PROCESSING MACHINES

BACKGROUND OF THE INVENTION

1. Field of the Invention

A hopper loader, also known as a shot hopper, for processing machines such as molding machines is provided which is particularly useful in supplying particulate material to a molding machine, such as an injection molding machine. The hopper loader hereof includes a housing designed to advantageously accommodate particulate material of different sizes and promotes efficient usage by utilizing a transparent hopper and the configuration of the filter element.

2. Description of the Prior Art

Hopper loaders, and particularly hopper loaders of the shot hopper type, are used in conjunction with processing machines. A "shot" refers to one cycle of a molding machine, and thus a shot hopper is designed to hold and deliver a sufficient quantity of material to complete one cycle of a molding machine. An exemplary use of a hopper loader is to accumulate and then deliver synthetic resin particulate material, for example polyethylene, to molding machines. These molding machines receive the synthetic resin particulate material from the hopper loader, heat the synthetic resin to a desired temperature to melt the resin and then force it into molds. When cooled, the resin forms useful articles. The synthetic resin particulate material is typically delivered to the hopper loader by pneumatic means whereby a quantity sufficient to supply the molding machine or other processing equipment remains on hand, providing a supply of raw material for processing in a mode suited to the machine.

In most instances, the hopper loader may readily handle particulate material which is relatively uniform and has not previously processed. For example, in the case of injection molding machines, synthetic resin (also known as "plastic") which has not previously been used in the molding process is relatively uniform and easy to convey and process. This so-called "virgin plastic" is typically provided in pellet form and is to be contrasted with what is known in the industry as "regrind." Regrind plastic is, for example, polyethylene which has either been recovered from waste or scrap after processing through a molding machine or from recycled articles and ground into a flake. In either case, regrind plastic may be re-used in the molding process, but as noted is typically of a different particulate size or character. As such, it is typical to reprocess regrind plastic with virgin plastic in a mixture delivered to a hopper loader, rather than to use only regrind plastic in molding an article.

The combination of virgin and regrind plastic is often more difficult to process through a processing machine, such as a molding machine, particularly at the hopper loader. This combination of virgin and regrind plastic has a tendency to clog inside conventional hopper loaders. Heretofore, conventional hopper loaders have not heretofore been capable of handling 100% regrind or even a majority of regrind in a mix of regrind and virgin plastic. Even in mixes of virgin plastic and regrind at lower proportions of regrind, significant downtime and maintenance is required to deal with such clogging, and to maintain a necessary volume of material within the hopper to be processed. Another problem which has been encountered is the particulate material entrained in the air which conveys it to the loader, with difficulty in handling the air which must be filtered to remove the particulate before being exhausted to the atmosphere.

As a consequence, there has developed a need for an improved hopper loader which addresses these and other problems.

SUMMARY OF THE INVENTION

These and other problems have largely been solved by the hopper loader of the present invention. The hopper loader hereof is beneficially configured to handle a combination of synthetic resin pellets (virgin plastic) and synthetic resin flakes (regrind plastic) or even 100% regrind for delivery to a processing machine such as, for example, an injection molding machine, without clogging and is more effectively monitored and more efficiently maintained for operation.

The hopper loader hereof broadly includes a receiver where particulate material to be processed is conveyed, preferably pneumatically, a hopper assembly which includes an upright side wall defining therein a chamber where the particulate material is collected and a feed throat for delivering the particulate material to the processing machine. The hopper assembly may beneficially include a mounting plate for mounting and, as required, adapting the hopper assembly to a particular processing machine, and most preferably the hopper is retained on the mounting plate by gravity and without the need for clamps or other fasteners to promote its swift removal for servicing as may be necessary. The feed throat is large and unobstructed, and preferably has a generally circular cross-section, and provides improved flow of the particulate material without bridging to cause obstructions. The hopper side walls are preferably translucent, most preferably transparent, thus facilitating monitoring of the amount of material present in the chamber. This monitoring may be accomplished visually by the processing machine operator, and/or by a sensor, such as a proximity sensor or optical sensor mounted on a guide assembly which permits selective vertical positioning of the sensor along the exterior of the side wall of the hopper. The receiver preferably includes a tubular inlet positioned along the side of the receiver for attachment to a hose or other source which delivers particulate material to the receiver. The receiver preferably includes a large open area defined by a circumscribing top edge, the large open area having a greater area than the open area of the tubular inlet through which particulate material is supplied. A filter, most preferably including a flexible air permeable filter element extends upwardly from and spans across the top edge. The filter element may be supported by a stay, which may be a flexible rod or rod-like stay positioned interiorly of the filter element. This configuration of the receiver and the filter enables particulate material which collects on an interior side of the filter element to periodically fall back into the chamber under the influence of gravity, thereby using this collected material in the processing operation and further reducing the tendency of the filter element to clog by the accumulation of fine particles. Further, maintenance of the hopper loader is enhanced by the use of latching members which clamp together the hopper and receiver and permit their detachment without the use of tools.

As a result, the hopper loader of the present invention, which is simple and elegant in construction, is easy to maintain and typically extends the duration of operation before maintenance is required. When both virgin plastic and regrind plastic is used as the particulate material, a reduction in downtime of the processing material due to replacement or servicing of the filter element or clogging is expected. The translucent side walls of the hopper facilitate adjustment of the feed rate during processing operations to maintain a desired level of particulate material in the chamber. These and other advantages will be readily appreciated by those skilled in the art with reference to the drawings and description which follow.

DESCRIPTION OF THE PREFERRED EMBODIMENT

Figure 2:
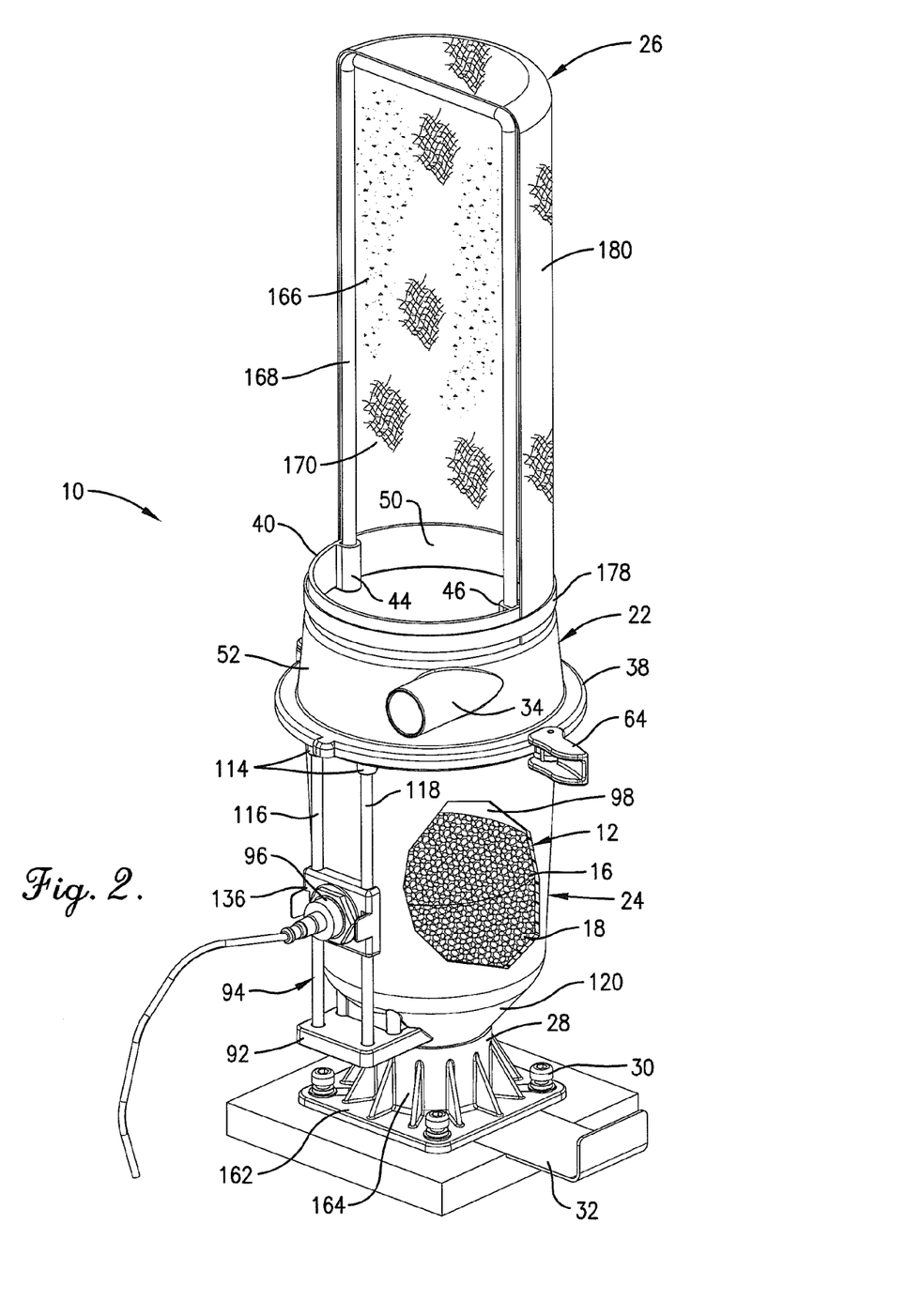
FIG. 2 is an enlarged perspective view of the hopper loader hereof, with a portion of a filter element removed to show a supporting stay and a portion of the side wall of a hopper of a hopper assembly removed to show particulate material received within the chamber.

Referring now to the drawings, a hopper loader 10 in accordance with the present invention is configured for accumulating particulate material 12 (as seen in FIG. 2) and delivering the particulate material on demand to a processing machine 14 shown schematically, which may be, for example, an injection molding machine using synthetic resin particulate material. The particulate material 12 may include a mixture of materials of different sizes, composition or configuration, for example, synthetic resin pellets 16 which have not previously gone through the molding process, also known to those skilled in the art as virgin plastic and which are relatively uniform, and synthetic resin flakes 18 which may be of a wider range of sizes and are obtained by grinding synthetic resin which has previously gone through the molding process. In a typical application, such particulate material is pneumatically conveyed to the hopper loader 10 via a hose 20 or other tubular conduit.

Broadly speaking, the hopper loader 10 hereof may include a receiver 22, a hopper assembly 24, and a filter 26. The hopper loader 10 is designed to be mounted atop the processing machine 14 whereby gravity feeds the particulate material 12 to the processing machine. Beneficially, the filter 26 is positioned atop the receiver 22, and the receiver 22 in turn is positioned atop the hopper assembly 24. The hopper assembly 24 may include a mounting plate 28 which may be coupled by threaded fasteners 30 to the processing machine 14, and a slide gate valve 32 may be employed between the mounting plate 28 and the processing machine when it is desired to interrupt the flow of particulate material 12 from the hopper loader 10 into the processing machine 14.

Figure 8:
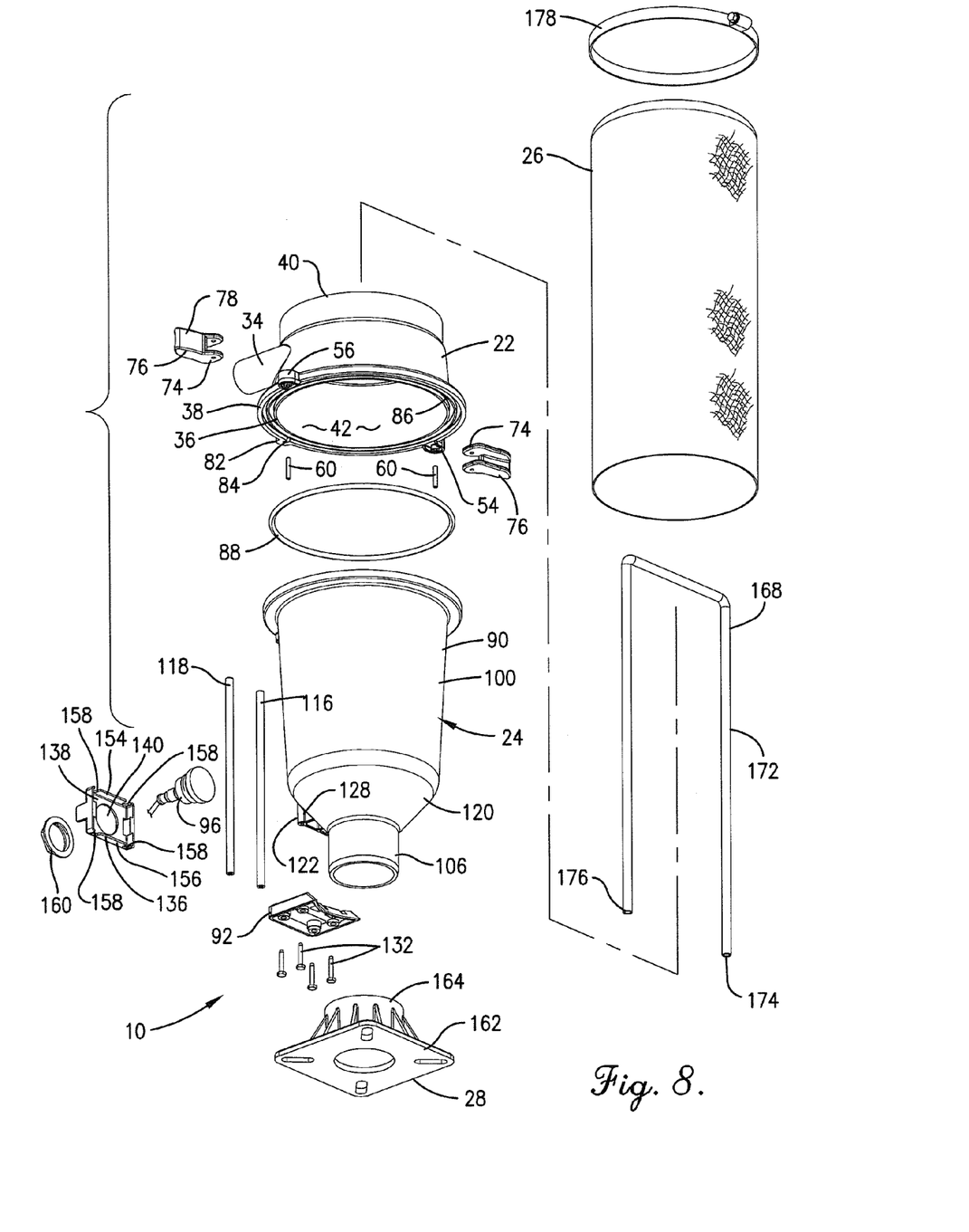
FIG. 8 is an exploded view of the hopper loader hereof from a bottom right rear perspective orientation.

In greater detail, the receiver 22 may be integrally molded or formed of a variety of different materials such as metal or, more preferably, molded of synthetic resin such as polyethylene or polyvinyl chloride. The receiver 22 includes a tubular inlet 34 preferably extending through and generally tangentially with respect to a generally upright receiver wall 36, and a flange 38 extending outwardly from the receiver wall 36. The receiver wall 36 is preferably substantially circular when viewed in cross section and may be somewhat tapered from a top edge 40 downwardly toward the flange 38 which is positioned proximate the bottom of the receiver wall 36 which presents a discharge outlet 42, best seen in FIG. 8. The discharge outlet 42 is preferably generally circular, presenting a substantially greater area and a substantially greater transverse dimension than the area and greatest transverse dimension than that of the tubular inlet 34. The top edge 40 is also preferably generally circular when viewed in plan and has a substantially greater area and greater transverse dimension than that of the tubular inlet 34, but the area and transverse dimension of the top edge 40 may be somewhat less than those of the discharge outlet 42. First and second stay mounts 44, 46 each having a recess 48 may extend radially inwardly and are preferably diametrically spaced and opposed on an inner side 50 of the upright receiver wall 36, the tubular inlet 34 then being positioned to extend preferably tangentially from an outer side 52 of the upright receiver wall 36 to promote flow and distribution of the particulate material conveyed by the hose 20.

Figure 4:
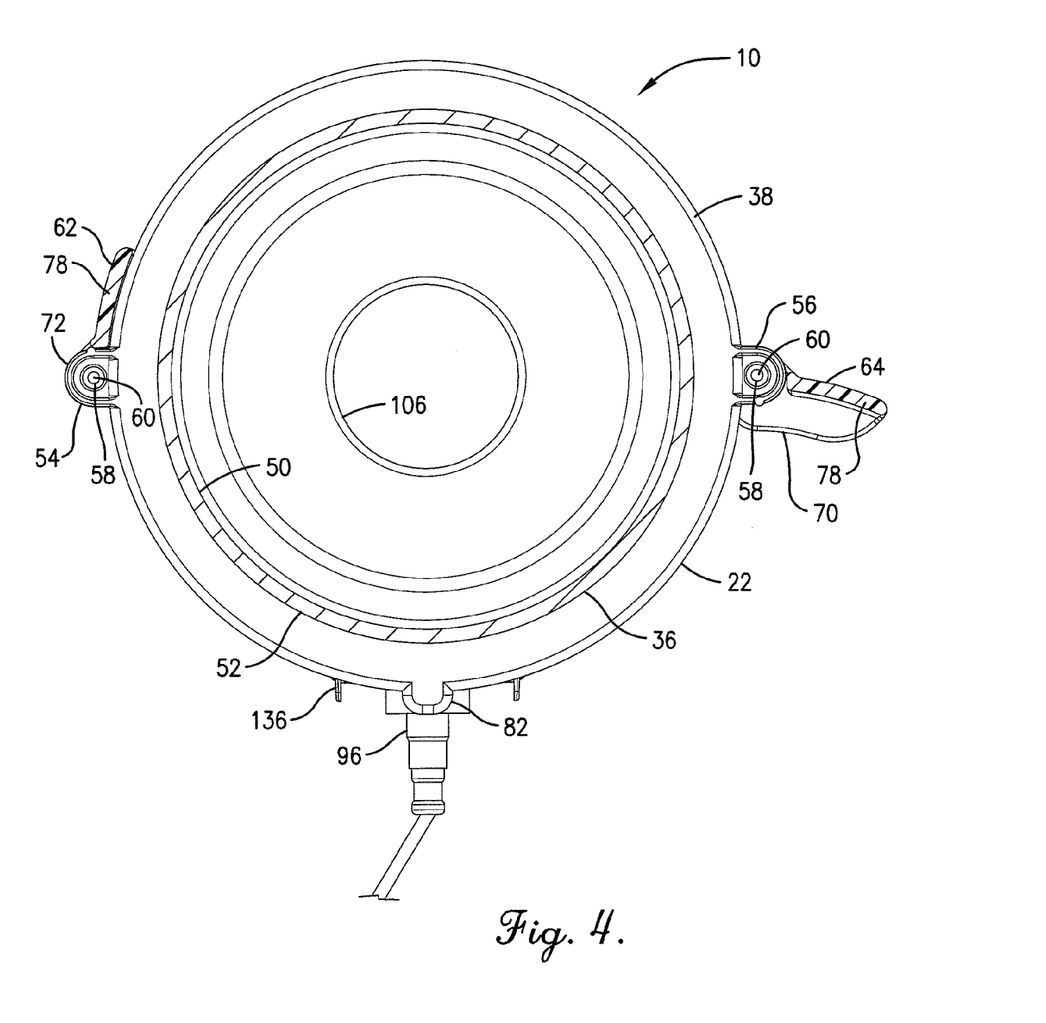
FIG. 4 is a horizontal cross-sectional view taken along line 4-4 of FIG. 3 to show the clamping members and the chamber within the hopper with the particulate material shown in FIG. 2 removed.

The stay mounts 44, 46 may be aligned in a common vertical plane with respective oppositely extending first and second latch mounts 54, 56 located on the flange 38 which preferably circumscribes the upright receiver wall 36. The first and second latch mounts 54, 56 may each have an arcuate outer portion and may have a detent between the arcuate outer portion and generally flat sides located more proximate the upright receiver wall 36. The latch mounts 54, 56 each further include a generally vertically extending opening 58 adapted and configured to receive a pivot pin 60 or equivalently a rivet or threaded fastener, therein. Swing-out latching members 62, 64 are pivotally mounted by the pivot pins 60 to the respective first and second latch mounts 54, 56. Each of the latching members may include respective upper and lower latch plates 66, 68, which may be of identical configuration. Each of the latch plates 66, 68 may include a back edge 70 which may be configured with an arcuate section to generally conform to the respective arcuate outer side 52 of the upright receiver wall 36 and hopper assembly 24 when the latching members 62 and 64 are in a closed or clamping position as illustrated by the position of latching member 62 in FIG. 4. Each of the latch plates 66, 68 may further include an enlarged head portion 72 which includes an engagement edge 74 angled relative to the back edge 70 and which is positioned to engage one or both of the outer side 52 of the upright receiver wall 36 and the hopper assembly 24 when the latching members 62, 64 are pivoted to an open position, as illustrated by latching member 64 in FIG. 4. The latch plates 66, 68 are connected along a front edge 76 opposite to and laterally spaced from the back edge 70 by a connecting wall 78 which is graspable by a user, thereby presenting an open region 80 between the connecting wall 78 and the back edge 70 and between the latch plates 66, 68 into which the flange 38 and a corresponding rim of the hopper assembly 24 may be received and clamped together. By positioning a leading edge of the connecting wall 78 in engagement with one of the flat sides of the latch mounts 54, 56, the latching members 62, 64 will overcome the detent when swinging outwardly to a disengaged position (as illustrated by latching member 64 in FIG. 4) and will snap into the closed position (as illustrated by latching member 62 in FIG. 4) and be held by the detent when in a closed position. Flange 38 may further include a locating lug 82 positioned circumferentially intermediate the first and second latch mounts 54, 56, the locating lug 82 having a recess 84 on the underside thereof adapted and configured for receiving a locating nib on the hopper assembly 24 for facilitating alignment and resisting rotation between the receiver 22 and the hopper assembly 24. The underside of the flange 38 may be provided with a circumferentially extending continuous slot 86 into which a gasket 88 may be inserted to seal the mating surfaces of the receiver 22 and hopper assembly 24.

The hopper assembly 24 is preferably positioned immediately below the receiver 22 in order to collect the particulate material 12 delivered to the receiver 22.

Figure 3:
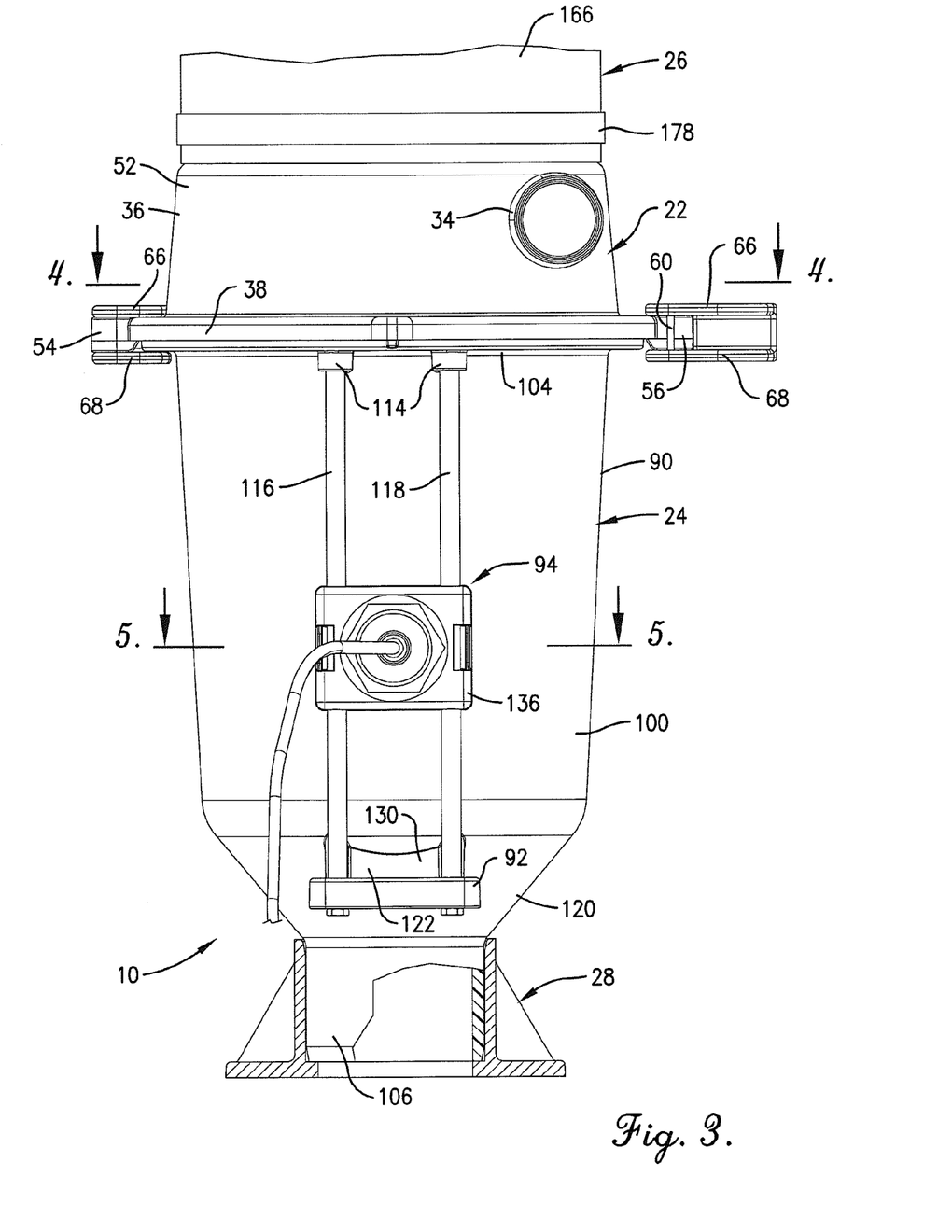
FIG. 3 is an enlarged side elevational view of the hopper loader hereof showing the sensor selectively positioned along the side wall of the hopper, and, with a portion of the filter not shown for clarity, and with the mounting plate shown in section and a part of the feed throat of the hopper broken away for clarity.

The hopper assembly may include a hopper 90, mounting plate 28, and a guide assembly 94 for carrying a sensor 96 adapted and positioned for monitoring the amount of particulate material 12 received in a chamber 98 within the hopper 90. The hopper 90 includes an upright side wall 100 which may be generally frustoconical in shape, that is, circular in cross-section and tapering slightly from an upper end 102 which is proximate a rim 104, toward a feed throat 106 located at the bottom of the hopper 90. The hopper 90 may be cast or molded, but is preferably of a translucent material, most preferably a transparent material. Suitable materials may include synthetic resin or glass to provide sufficient translucency or, more preferably, transparency. A mouth 108, preferably substantially circular in configuration, is located within the rim 104 at the uppermost portion of the upright side wall 100 which mouth 108 has an area and greatest transverse dimension generally corresponding to those dimensions of the discharge outlet 42 of the receiver 22 and only slightly less than the open area adjacent the top edge of the receiver 22. The rim 104 may be a surrounding rim which extends completely around the side wall 100 proximate the mouth 108, and having an inner circumscribing recessed shelf 110 into which the gasket 88 may be received. A locating nib 112 may be provided on the rim 104, the locating nib 112 projecting outwardly and being complementally configured with the recess 84 of the locating lug 82 so that the locating nib 112 may be received into the recess 84 when the receiver 22 is brought into mating engagement with the hopper assembly 24. The underside of the rim 104, as shown in FIG. 3, may be provided with first and second downwardly projecting collars 114 integrally formed and thus unitary with the rim 104. Each of the collars 114 are sized and configured to hold a respective first or second guide rod 116, 118 therein. The upright side wall 100 may narrow and thus taper considerably in a transition zone 120 to feed throat 106, which may be substantially cylindrical in configuration. A mounting shoulder 122 may be molded on a part of the exterior surface 124 of the transition zone 120, the mounting shoulder 122 including spaced apart, first and second internally threaded sleeves 126, 128 each supported by a gusset and connected by a connecting web 130. The mounting shoulder 122 is generally vertically aligned with the collars 114.

Figure 5:
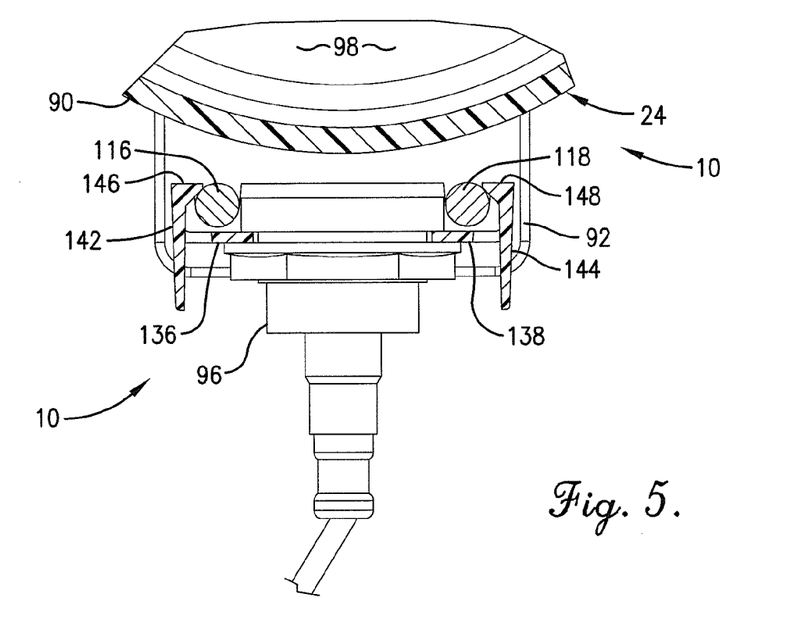
FIG. 5 is an enlarged horizontal cross-sectional view taken along line 5-5 of FIG. 3 for showing the sensor mount coupled to the guide, the sensor mount carrying the sensor for selective vertical movement along the guide.
Figure 6:
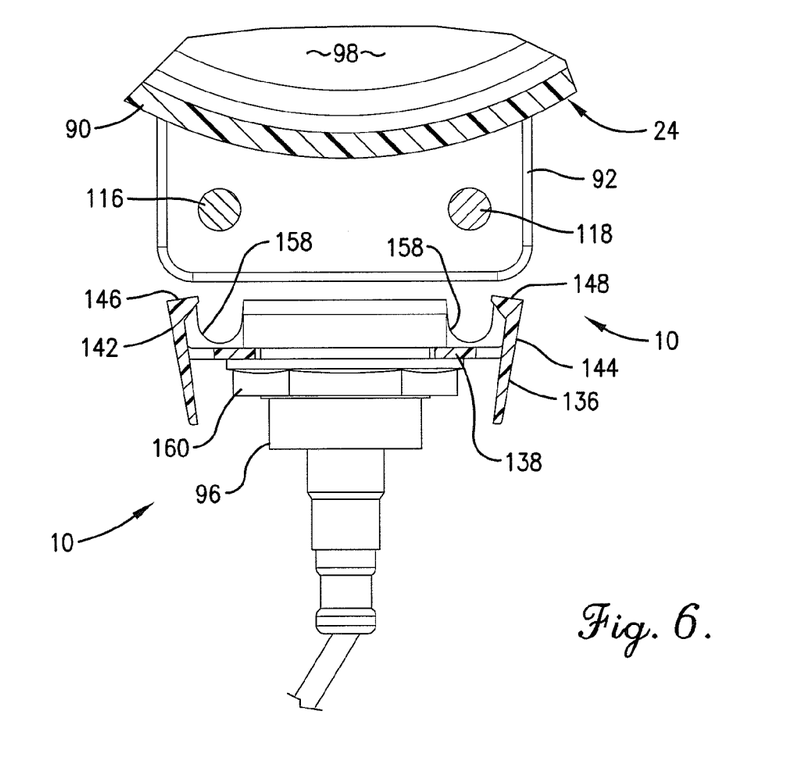
FIG. 6 is an enlarged horizontal cross-sectional view similar to that of FIG. 5, showing the detachment of the sensor mount from the guide.
Figure 7:
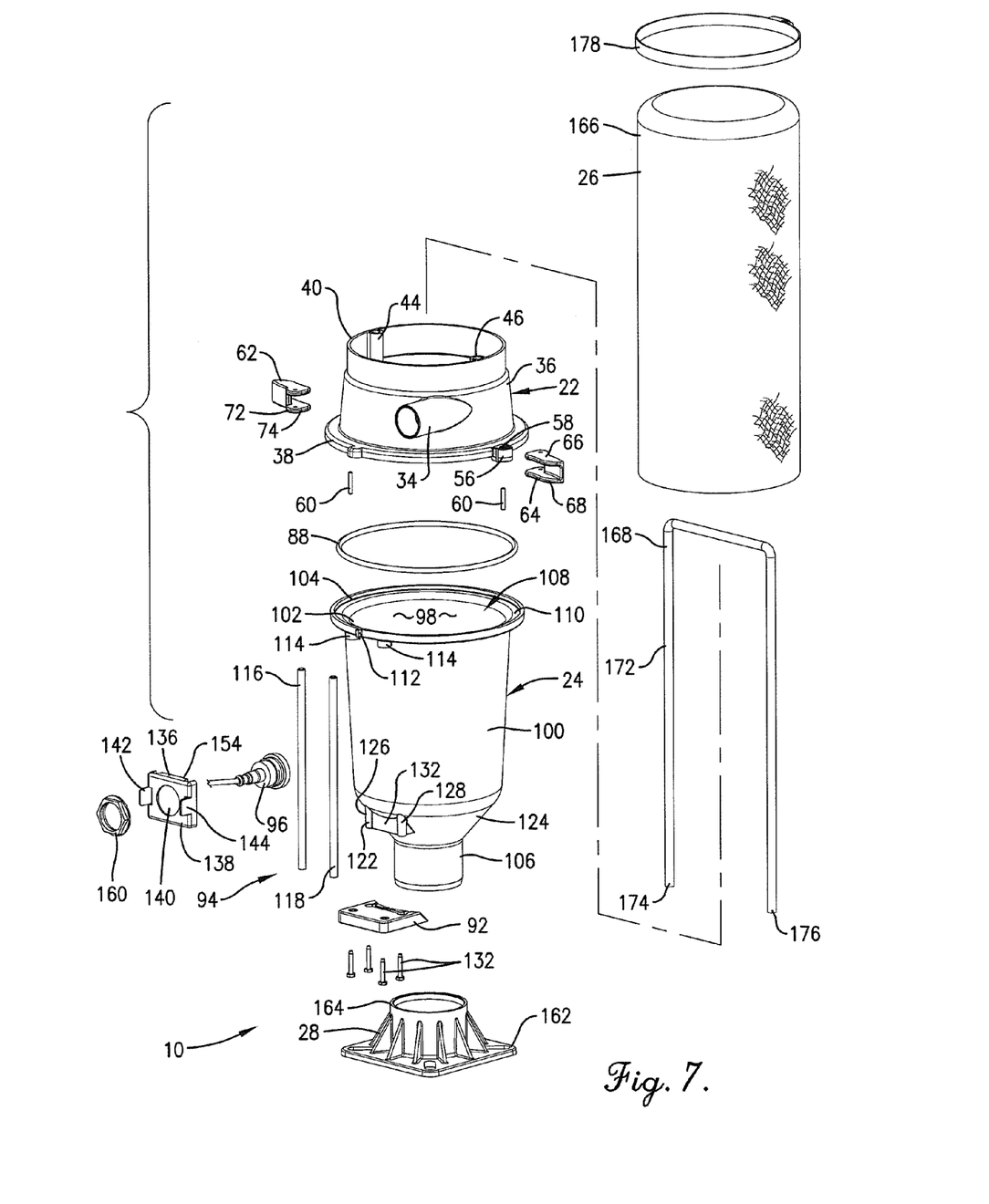
FIG. 7 is an exploded view of the hopper loader hereof from a top right front perspective orientation.

The collars 114 and the mounting shoulder 122 may be used to mount and support the guide assembly 94. The guide assembly 94 may include the guide rods 116 and 118 which are generally vertically oriented. The top end of each of the guide rods 116, 118 are held by a respective one of the collars 114 formed on the underside of the rim 104. The bottom end of each of the guide rods 116, 118 is supported and retained by a guide bracket 92. As see, for example, in FIGS. 2, 7 and 8, the guide bracket 92 is complementally configured to be coupled to the mounting shoulder 122 by, for example, threaded fasteners 132 inserted through openings in the guide bracket 92 and threaded into the threaded sleeves 126, 128. In addition, the bottom end of each of the guide rods 116, 118 may be internally threaded, such that when the bottom ends of the guide rods 116, 118 are inserted into complementally configured sleeves 134 preferably positioned below and in vertical alignment with the collars 114 and configured for retaining the guide rods, threaded fasteners 132 inserted through the sleeves 134 and threaded into the bottom ends of the guide rods 116, 118 serve to retain the guide rods in both the collars 114 and the guide bracket 92. A sensor mount 136 is provided which may be coupled to the guide rods 116, 118 for selective shiftable movement and vertical positioning along the guide rods. As may be seen in FIGS. 5 and 6, for example, the sensor mount 136 may include a front panel 138 having a central opening 140. First and second tabs 142, 144 are positioned to extend forwardly and rearwardly of the front panel 138, each of the tabs 142, 144 including opposed, inwardly facing catches 146 on their respective inside ends 148. The tabs 142, 144 may be preferably molded as a unitary part of the sensor mount 136 and the side panels 150, 152 which extend rearwardly from the front panel 138. The sensor mount 136 further includes an extending top flap 154 and an opposed, spaced apart extending bottom flap 156. Both the top flap 154 and the bottom flap 156 include a pair of grooves 158, the grooves 158 being complementally configured to receive and retain the guide rods 116, 118 and to permit vertical movement of the sensor mount 136 along the guide rods when the tabs 142 and 144 are squeezed together to release the catches 146. However, when the tabs 142 and 144 are released, they are biased back to their original position with the catches 146 engaging the guide rods 116, 118 and holding the guide rods in the grooves to retain the desired selected vertical position of the sensor mount 136. Sensor 96 may be, for example, a proximity sensor or alternatively, an optical sensor, which is operatively connected to a control device by an electric conduit, and mounted to pass through the central opening 140 and held on the sensor mount 136 by, for example, nut 160 in order to move with the sensor mount 136 when the user selectively positions the sensor mount 136 along the guide rods 116, 118.

Mounting plate 28 includes a base 162 and a tubular column 164 sized, configured and adapted for receiving and mounting the feed throat 106 of the hopper 90 thereon whereby particulate material 12 located within the chamber 98 interior to the upright side wall 100 may pass through the feed throat 106 and thus through the tubular column 150 and into the processing machine 14 on demand. The hopper 90 is preferably retained on the mounting plate 92 only by gravity and without additional fasteners, whereby the feed throat 106 of the hopper 90 fits within the tubular column and may be easily lifted from the mounting plate 92 without the use of tools. The base 162 may include holes spaced according to the particular processing machine 14 whereby bolts or other threaded fasteners may pass therethrough to couple the mounting plate 92 to the processing machine.

Filter 26 may include a filter element 166 and a stay 168 which may be positioned on an interior side 156 of the filter element 152 in order to support and position it. Most preferably, the filter 26 does not include any housing. Filter element 166 is preferably of a flexible, air permeable fabric material which permits air to pass therethrough to the atmosphere but blocks the passage of larger particulate material 12, which is retained on the interior side 170. For use in connection with synthetic resin molding machines using a combination of virgin plastic and regrind plastic as described herein, a filter element of polyester material having nominal 50 micron openings may be suitable. One suitable material for the filter element 166 may be, for example, obtained from Parker Hannifin Corporation of Indianapolis under part number G1PE50-10. The filter element 152 may preferably be supported in an extended, tented condition spanning and extending over the top edge 40 of the receiver 22 so that particulate material collected on the interior side 170 falls under the influence of gravity, air movement and movement of the flexible material of the filter element 166 back into the chamber 98. The tented, extended configuration of the filter element 166 may be achieved by the stay 168, which may be provided as a generally inverted U-shaped rod 172 which is configured with two ends 174, 176 which are received and located in respective stay mounts 44, 46. A clamp 178 may be useful to slide over the exterior side 180 of the filter element 166 for securing it to the receiver 22.

Figure 1:
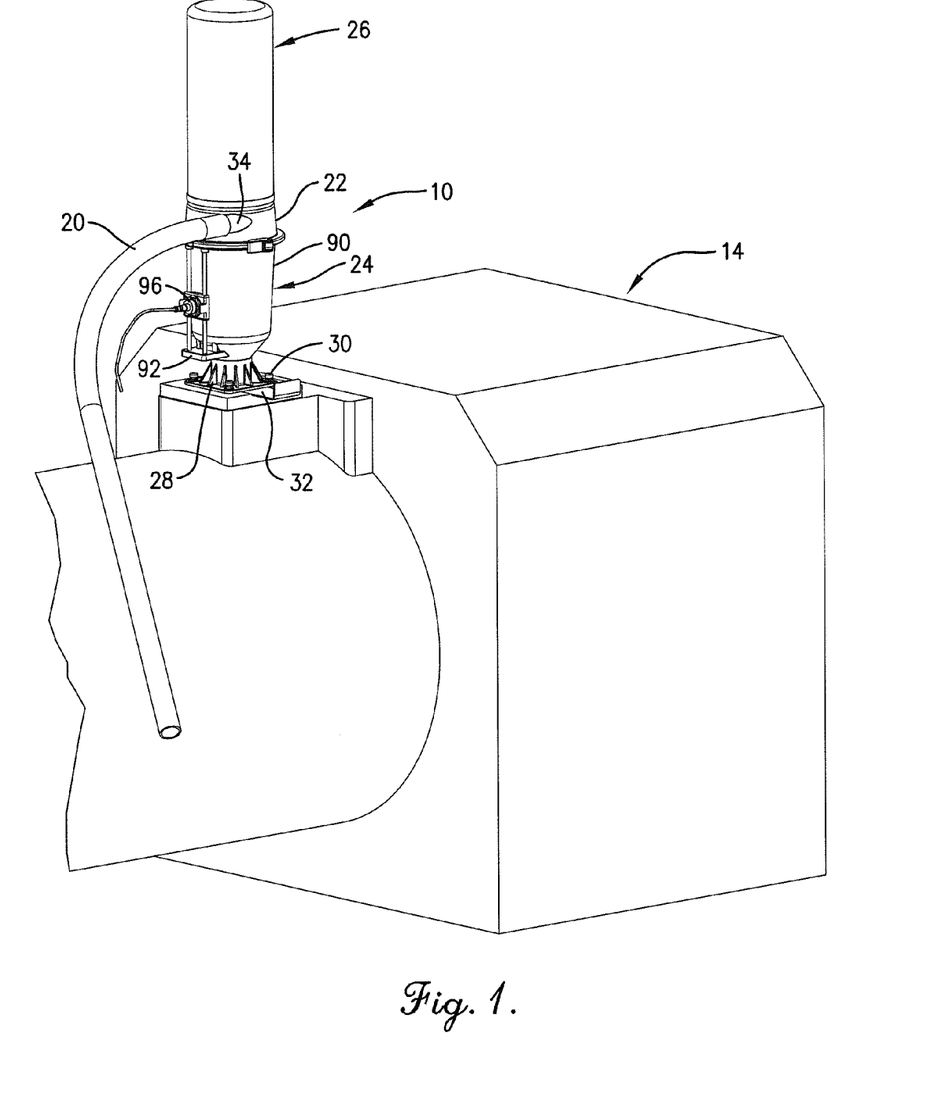
FIG. 1 is a perspective view showing the hopper loader of the present invention connected to a hose serving as a delivery source for particulate material, the hopper loader being shown mounted above a processing machine.

In use, the hopper loader 10 is assembled and mounted atop the processing machine 14 as shown in FIGS. 1 and 2. When the pneumatic conveying system is energized, particulate material 12 is delivered via the hose 20 to the tubular inlet of the receiver 22. Being conveyed by pressurized air, the particulate material swirls within the receiver 22 and the particulate material settles in the chamber 98, with the air being discharged through the filter element 166. The translucent, or most preferably transparent side wall 100 of the hopper 90 permits visual monitoring of not merely the level of particulate material 12 held in the chamber 98, but also of the behavior of the material and, when a mixture of materials, such as virgin plastic pellets and regrind plastic flakes, and perhaps additional materials such as colorant, are being delivered to the hopper loader 10, the composition and make-up of the particulate material 12. For example as to the behavior, unlike in conventional hoppers of opaque material such as metal, the operator can observe the distribution of the particulate material within the chamber 98 and whether it is clogging or bridging as it moves downwardly into the feed throat 106. The operator can also observe whether the proper proportions of virgin plastic, regrind plastic, colorant, etc. are being delivered and if necessary make adjustments or suspend the operation of the processing equipment 14 if the make-up of the material in the chamber 98 is not as desired. It is often the case when quantities of regrind plastic are used in the mixture that the regrind plastic may experience delivery problems upstream from the hopper loader 10, and absent intervention or adjustment, an excessive amount of virgin plastic pellets are delivered to the processing machine 14. The operator may also make rapid adjustments in the vertical positioning of the sensor 96 to ensure sufficient quantities or particulate material are delivered to the hopper loader 10. Furthermore, the use of a translucent material for the side wall 100 of the hopper 90 enables the use of not only proximity sensors but also optical sensors to monitor the level of particulate material 12 in the chamber 98.

It is expected that during operation, significant quantities of particulate material 12 will be trapped by the filter element 166 and accumulate on the interior side 170. However, the filter is configured in cooperation with the wide open area of the receiver 22 at the top edge 40 so that particulate material 12 which collects on the filter element is dislodged by the movement of air, the effects of gravity, and the flexing of the filter element 166 such that the particulate material 12 collected on the filter element 166 falls downwardly through the receiver 22 and is deposited in the chamber 98 within the hopper 90. As a result, a greater proportion of the often troublesome regrind plastic may be used in the mixture making up the particulate material, and the filter 150 is substantially trouble free. Unlike conventional filters used with hopper loaders, the hopper loader 10 hereof resists clogging while still substantially preventing the discharge of particulate material into the atmosphere. Thus, the hopper loader 10 may continue operation for an extended period, compared to typical hopper loaders which may clog after only about two or more shots.

When closer inspection or maintenance of the hopper loader 10 is necessary, this may be readily accomplished. First, while the sensor 96 is securely attached to the guide assembly, the sensor may also be easily detached by grasping and pinching the tabs of the sensor mount to detach it from the guide rods. Second, the latching members permit swift removal or reattachment and clamping of the receiver 22 from the hopper assembly 24 without the use of tools. Third, the fit between the feed throat 106 and the mounting plate 92 permit easy removal and installation of the hopper 90 from the processing equipment 14.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus or method not materially departing from but outside the literal scope of the invention as set out in the following claims.

The invention claimed is:

1. A hopper loader for feeding particulate material to a processing machine comprising:
    a receiver including a surrounding wall having a tubular inlet adapted for receiving particulate material conveyed by pressurized air into the receiver, a discharge outlet positioned in spaced relationship and below the tubular inlet, and a top edge positioned above the discharge outlet;
    a hopper assembly including a hopper having a translucent upright side wall defining therein a chamber adapted and configured for receiving particulate material, a mouth having an upper edge and configured for receiving particulate material from the receiver into the chamber, and a feed throat positioned below the chamber for delivering material to a processing machine, wherein said hopper is removably coupled to the receiver whereby said receiver including said tubular inlet may be removed and reattached to said hopper and wherein said upper edge of said mouth is substantially vertically aligned with said top edge of said receiver;
    a filter coupled to the receiver adjacent the top edge and extending above and spanning across the top edge whereby at least some particulate material held by the filter element may fall back under the influence of gravity into the chamber, wherein said filter includes a filter element of a flexible, air permeable fabric and a stay for holding the filter element in an upwardly extended configuration above the top edge of the hopper; and
    a guide assembly positioned exteriorly of said side wall, said guide assembly including a guide and a sensor mount shiftably mounted for selective vertical positioning along said guide, and further including a sensor coupled to the sensor mount for sensing the level of particulate material within the chamber, the upright side wall being substantially vertical and positioned intermediate the sensor and the chamber;

wherein said top edge of said receiver is generally circular and said receiver includes first and second diametrically positioned sockets proximate said top edge and wherein said stay includes a flexible arcuate rod complementarily configured for receipt in said sockets and wherein said arcuate rods extend upwardly from said sockets and interiorly of said filter element.

2. A hopper loader as set forth in claim 1, wherein said sensor is a proximity sensor.

3. A hopper loader as set forth in claim 1, wherein said sensor is an optical sensor.

4. A hopper loader as set forth in claim 1, the hopper assembly further including a mounting plate having a tubular column adapted for mounting the feed throat of the hopper thereon whereby particulate material located within the chamber interior to said upright side wall may pass through the tubular column, the mounting plate further including a base adapted for mounting to a processing machine.

5. A hopper loader as set forth in claim 1, further including at least one latching member pivotally connected to said receiver for releasably coupling said receiver to said hopper assembly.

6. A hopper loader as set forth in claim 5, wherein said receiver includes a first outwardly projecting flange positioned adjacent said discharge outlet and said hopper includes a second outwardly projecting flange positioned adjacent said mouth, said first flange being complementally configured with said second flange, each of said first and second flanges being positioned adjacent said latching member whereby said at least one latching member may be pivoted into a coupling position for holding said first flange and said second flange together for releasably coupling said receiver to said hopper assembly.

7. A hopper loader as set forth in claim 6, further including a second latching member pivotally connected to said receiver and positioned adjacent said first flange and said second flange whereby said second latching member may be pivoted into a coupling position for holding said first flange and said second flange together for releasably coupling said receiver to said hopper assembly.

8. A hopper loader as set forth in claim 1, the hopper assembly further including a mounting plate having a tubular column adapted for mounting the feed throat of the hopper thereon whereby particulate material located within the chamber interior to said upright side wall may pass through the tubular column, the mounting plate further including a base adapted for mounting to a processing machine.

9. A hopper loader as set forth in claim 8, wherein the feed throat of the hopper is received within said tubular column and retained therein by gravity.

* * * * *